(12) United States Patent
Yildirim et al.

(10) Patent No.: US 12,521,298 B2
(45) Date of Patent: Jan. 13, 2026

(54) WEARABLE LOWER EXTREMITY EXOSKELETON

(71) Applicant: OZYEGIN UNIVERSITESI, Istanbul (TR)

(72) Inventors: Mehmet Can Yildirim, Istanbul (TR); Barkan Ugurlu, Istanbul (TR); Polat Sendur, Istanbul (TR); Sinan Emre, Istanbul (TR); Mustafa Derman, Istanbul (TR); Sinan Coruk, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 997 days.

(21) Appl. No.: 17/621,372

(22) PCT Filed: Jun. 21, 2019

(86) PCT No.: PCT/TR2019/050483
§ 371 (c)(1),
(2) Date: Dec. 21, 2021

(87) PCT Pub. No.: WO2020/256663
PCT Pub. Date: Dec. 24, 2020

(65) Prior Publication Data
US 2022/0354729 A1    Nov. 10, 2022

(51) Int. Cl.
*A61H 3/00*    (2006.01)
*B25J 9/00*    (2006.01)

(52) U.S. Cl.
CPC .............. *A61H 3/00* (2013.01); *B25J 9/0006* (2013.01); *A61H 2201/1215* (2013.01); *A61H 2201/1642* (2013.01); *A61H 2201/165* (2013.01); *A61H 2201/1666* (2013.01); *A61H 2201/5064* (2013.01)

(58) Field of Classification Search
CPC ........ A61H 3/00; A61H 1/0237; A61H 1/024; A61H 1/0244; A61H 1/0262; B25J 9/0006
See application file for complete search history.

(56) References Cited

U.S. PATENT DOCUMENTS

| 7,963,932 B2* | 6/2011 | Ashihara ............... A61F 5/0102 601/5 |
| 2009/0312155 A1* | 12/2009 | Ikeuchi .................. B25J 9/0006 482/51 |
| 2011/0028874 A1* | 2/2011 | Hiki ...................... A61H 3/008 602/16 |

(Continued)

FOREIGN PATENT DOCUMENTS

| CN | 107468487 A | 12/2017 |
| DE | 102016104200 A1 | 12/2016 |

(Continued)

*Primary Examiner* — Rachel T Sippel
*Assistant Examiner* — Gwynneth L Howell
(74) *Attorney, Agent, or Firm* — Bayramoglu Law Offices LLC

(57) ABSTRACT

A wearable lower extremity exoskeleton for regenerating a lower body motion functionality of paraplegic patients is provided. The wearable lower extremity exoskeleton has four active DOF and each DOF provided by an actuator disposed around a hip level and a back and/or a front of a user and provided by articulations.

20 Claims, 12 Drawing Sheets

(56) References Cited

U.S. PATENT DOCUMENTS

| | | | |
|---|---|---|---|
| 2011/0066088 A1* | 3/2011 | Little | A61H 1/0255 601/35 |
| 2013/0296754 A1* | 11/2013 | Campbell | A61F 5/0127 602/16 |
| 2015/0321342 A1* | 11/2015 | Smith | A61H 3/00 74/490.03 |
| 2016/0158029 A1* | 6/2016 | Kuiken | A61F 2/64 623/24 |
| 2017/0007489 A1* | 1/2017 | Lin | G16H 40/63 |
| 2018/0344561 A1 | 12/2018 | Komatsu et al. | |

FOREIGN PATENT DOCUMENTS

| | | |
|---|---|---|
| EP | 1728492 A1 | 12/2006 |
| WO | 2019060791 A1 | 3/2019 |

\* cited by examiner

WEARABLE LOWER EXTREMITY EXOSKELETON

CROSS REFERENCE TO THE RELATED APPLICATIONS

This application is the national stage entry of International Application No. PCT/TR2019/050483, filed on Jun. 21, 2019, the entire contents of which are incorporated herein by reference.

TECHNICAL FIELD

The present invention relates to a wearable lower extremity exoskeleton for regenerating lower body motion functionality of paraplegic patients without additional/external support.

BACKGROUND

Spinal cord paralysis is a condition, which results from the full or partial loss of sensorimotor and autonomous functionalities of the spinal cord. Various neurological diseases, car accidents, sports injuries, and falls are responsible for most of the cases in spinal cord functionality loss. In particular, the patients with diagnosis paraplegia experience functionality loss in their lower body even though their upper body is completely healthy. On the mobility side, being not able to walk is generally compensated with wheelchairs. However, there are health risks such that these patients may suffer from osteoporosis, calcification in the excretory system, spasticity, difficulties in digestion and excretion, and heterotopic ossification. Using a wheelchair also introduces some issues like pressure wound, bone and muscle tissue loss, and aches on arms and shoulders. Wheelchairs that the patients use have certain condition impediments when the steps, stairs, and narrow pathways exist. The most practical approach to regenerate the walking function of paraplegic patients is active exoskeletons. In this approach, patients wear a robotic system which is the exoskeleton that can move their legs in the forward direction. The exoskeletons in the state of the art are able to support the patient actively from hip and knee joint (2 DOF for each leg) for hip and knee flexion and extension (F/E) movements. Since 2 DOF isn't enough for balancing and standing still, patients using these exoskeletons should actively use crutches to provide balance. When patients use crutches or walkers to balance with an exoskeleton, it causes aches on arms and shoulder joints after long periods. Thus, there is a need for a lower extremity exoskeleton providing balance without crutches.

BRIEF DESCRIPTION OF THE DRAWINGS

An exemplary embodiment of the present invention is illustrated by way of example in the accompanying drawings to be more easily understood and uses thereof will be more readily apparent when considered in view of the detailed description, in which like reference numbers indicate the same or similar elements, and the following figures in which.

Figure 1:
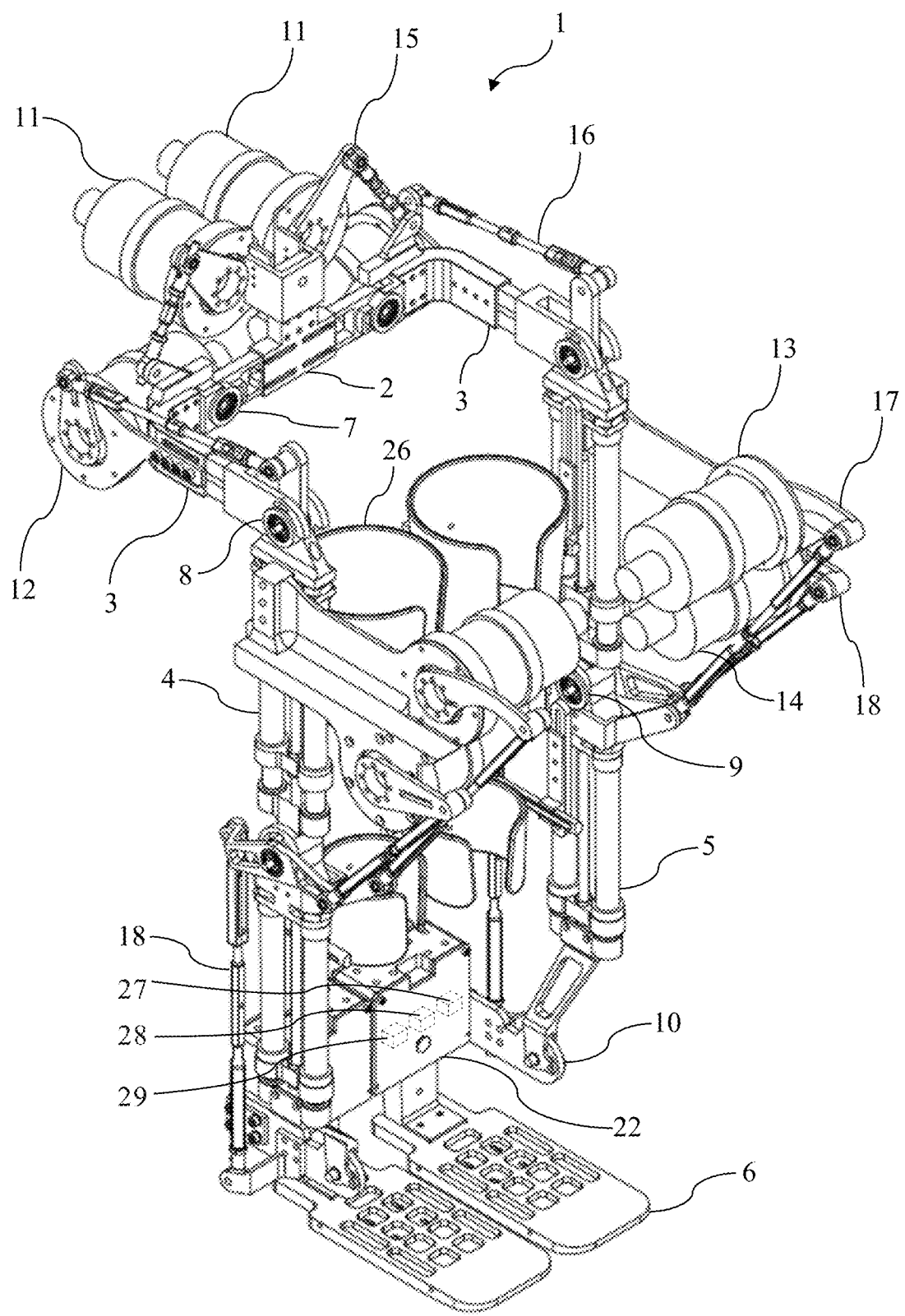
FIG. 1 is a view of exoskeleton in one exemplary embodiment of the present invention.

The elements illustrated in the figures are numbered as follows:
1. Exoskeleton
2. Back hip support
3. Side hip link
4. Thigh link
5. Shank link
6. Foot plate
7. Hip articulation
8. Thigh articulation
9. Shank articulation
10. Foot articulation
11. First actuator
12. Second actuator
13. Third actuator
14. Fourth actuator
15. First actuation transfer means
16. Second actuation transfer means
17. Third actuation transfer means
18. Fourth actuation transfer means
18.1 Crank
18.2 Coupler
18.3 Fever
18.4 Rocker
19. Driving shaft
20. Drive bracket
21. Transmitting rod
22. Resilient ankle means
23. Box
24. Base bracket
25. Resilient member
26. User connector
27. Control unit
28. Receiver
29. Orientation and/or proximity sensor
F. Feg
COM. Center of Mass
HU. Human User

DETAILED DESCRIPTION OF THE EMBODIMENTS

Embodiments of the present invention relates to a wearable lower extremity exoskeleton (1) comprising a back hip support (2) aligned with the hip level of a user in at least a standing position where the user worn the exoskeleton (1) and remained standing; at least two side hip links (3) each of which is rotatably connected to the one side of the back hip support (2) via at least one hip articulation (7) and two legs (L) each of which is rotatably connected to the each side hip link (3) via at least a thigh articulation (8).

Each leg (L) comprises a thigh link (4) to one end of which is rotatably connected to the side hip link (3), to other end of which is rotatably connected to a shank link (5) via at least one shank articulation (9) and a foot plate (6) rotatably connected to the shank link (5) via at least one foot articulation (10).

At least one first actuator (11) providing a rotational motion to the back hip support (2) and side hip links (3) in coronal plane via a first actuation transfer means (15) for supporting user in hip adduction and abduction; at least one second actuator (12) providing a rotational motion to the side hip links (3) and the thigh links (4) in sagittal plane via a second actuation transfer means (16) for supporting user in hip flexion and extension; at least third actuator (13) providing a rotational motion to the thigh links (4) and the shank links (5) in sagittal plane via a third actuation transfer means (17) for supporting user in knee flexion and extension; at least one fourth actuator (14) providing a rotational motion to the foot plates (6) in sagittal plane via a fourth actuation transfer means (18) for supporting user in ankle flexion and extension.

The first actuator (11), the second actuator (12), the third actuator (13) and the fourth actuator (14) are disposed around the hip level and back and/or front of the user in at least the standing position. In embodiments of the present invention, since self-balancing locomotion dictates that the user body center of mass (COM) must be laterally swayed in a small range, an inverted pendulum [representing COM, FIG. 3] mimicking manner is adopted. For this reason, several improvements are provided to the present invention such that number of DOFs is increased (4 active DOF via actuators and articulations, and preferably 2 passive DOF via a resilient ankle means (22)). Firstly, hip adduction/abduction capability is also provided by adding a hip articulation (7). Thereby, sway motion of the user body COM is mimicked and assisted.

Figure 2:
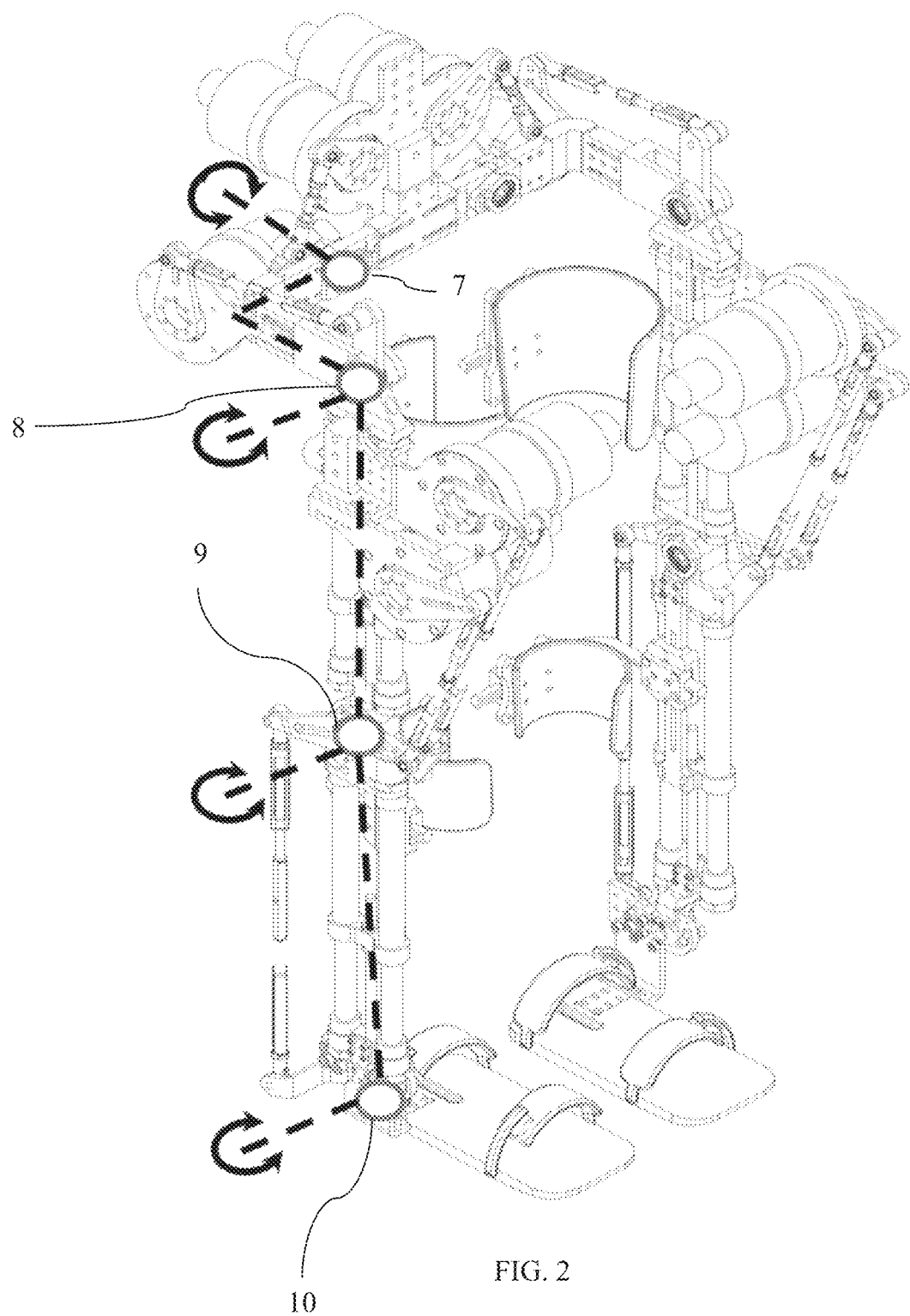
FIG. 2 is a view of exoskeleton showing rotational orientation of articulations in one exemplary embodiment of the present invention.
Figure 3:
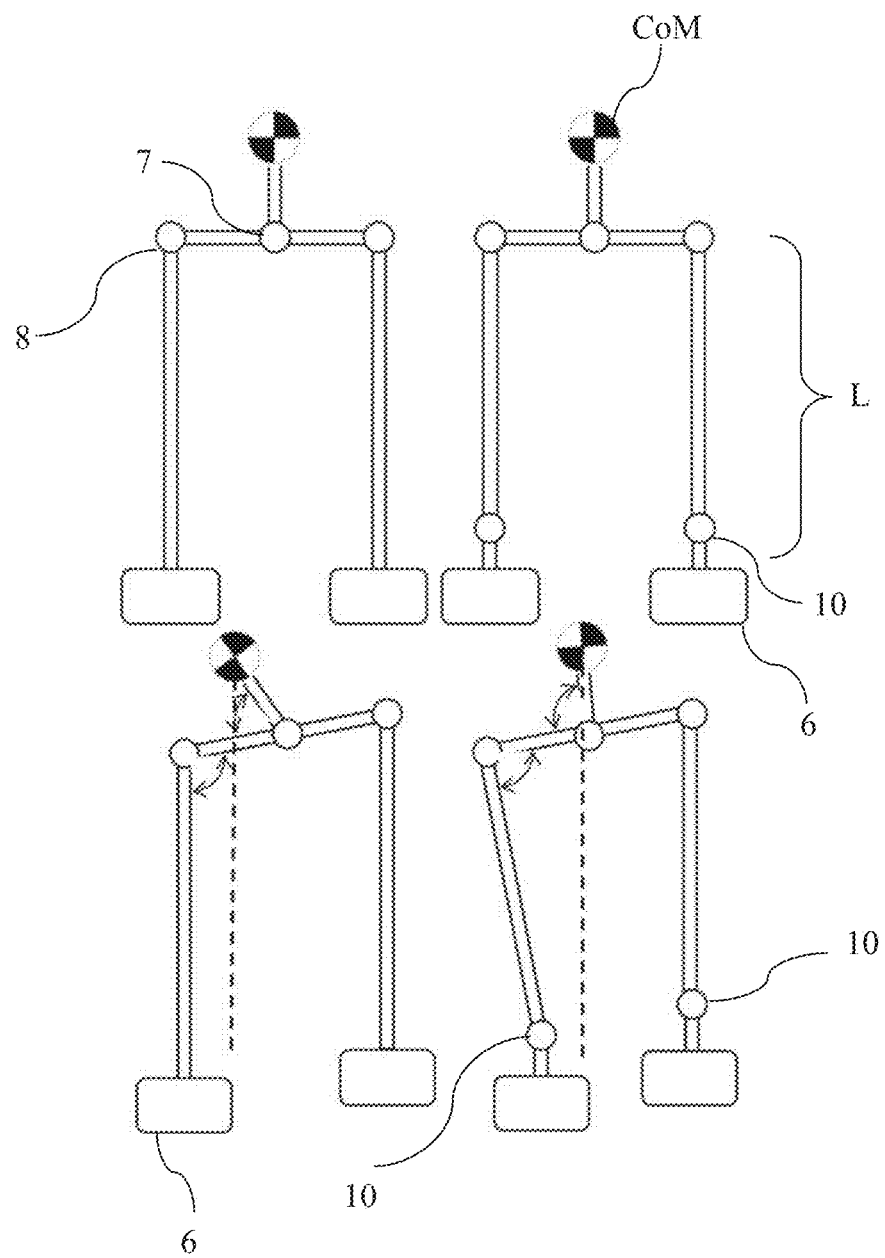
FIG. 3 is a schematic view of synergistic effect of hip articulation and foot articulation on range of sway motion in inverted pendulum mimicking manner in one exemplary embodiment of the present invention.
Figure 4:
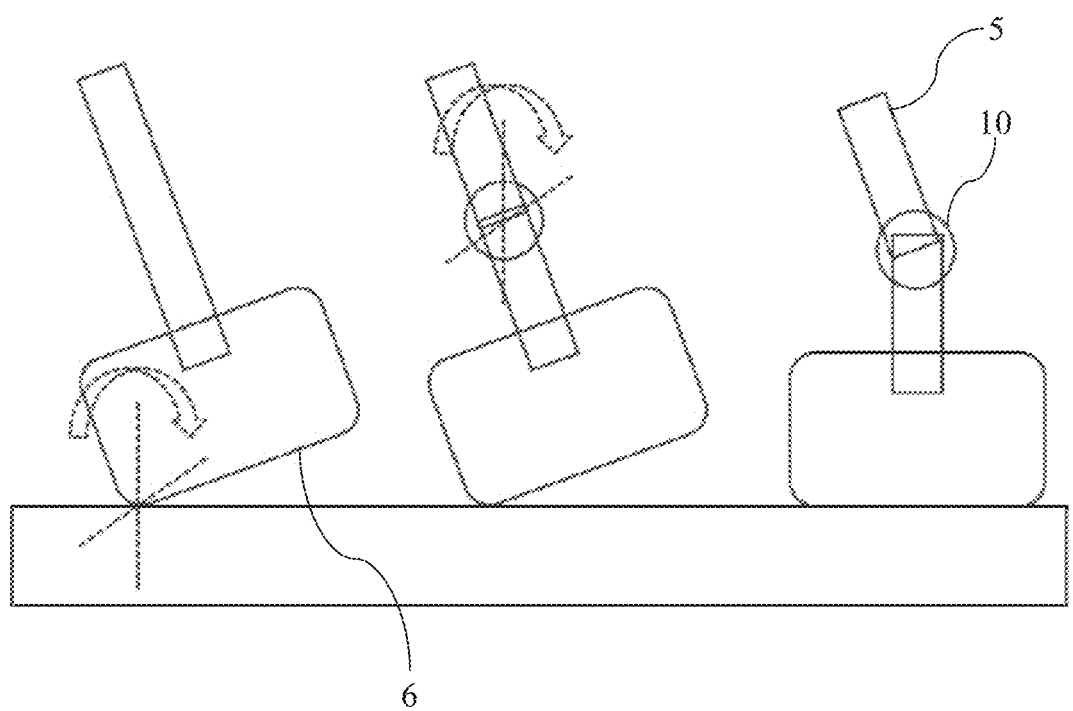
FIG. 4 is a schematic view of foot plate with and without foot articulation during locomotion in one exemplary embodiment of the present invention.
Figure 5:
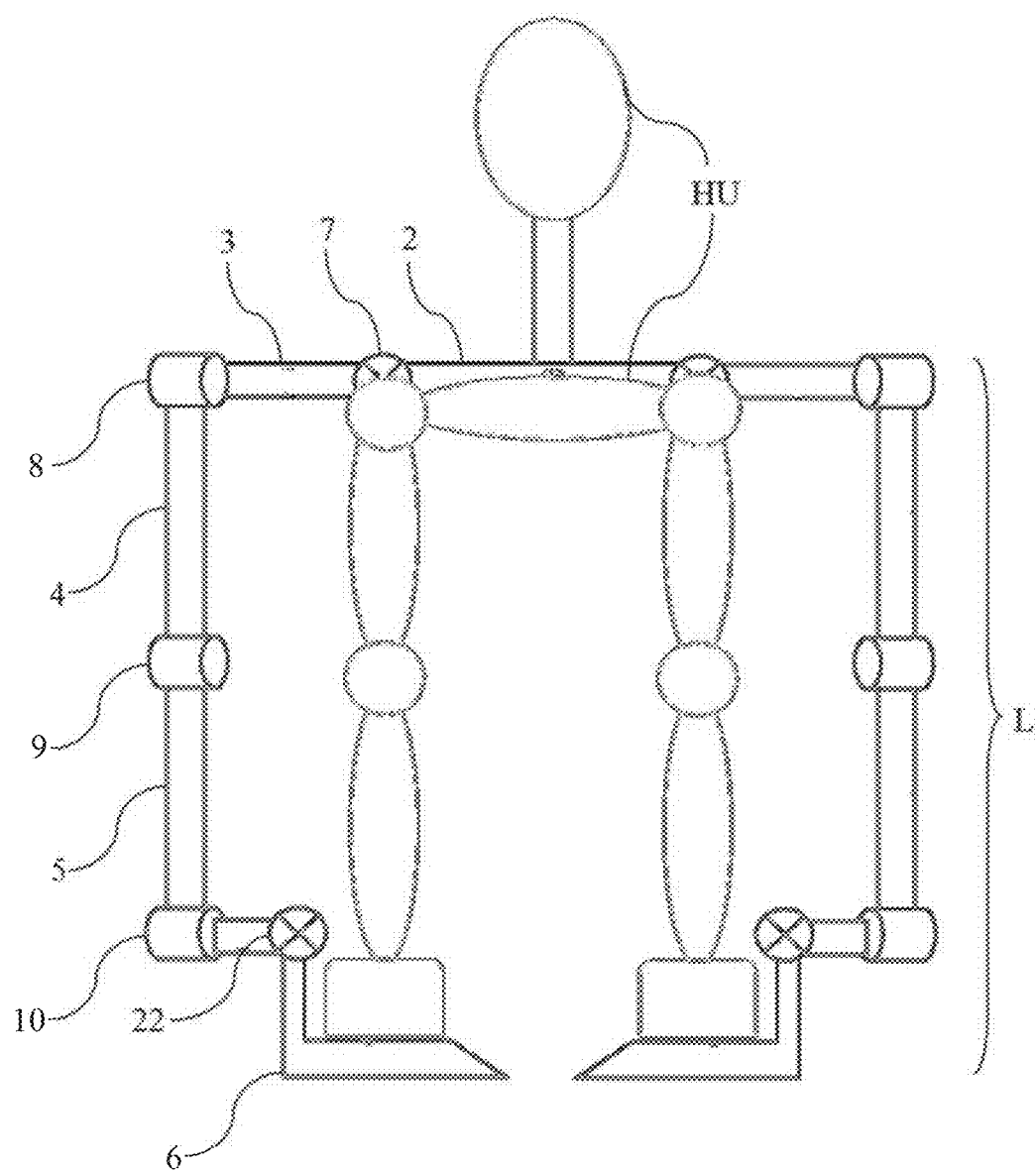
FIG. 5 is a schematic view of user joint-exo skeleton articulation coupling in one exemplary embodiment of the present invention.
Figure 6:
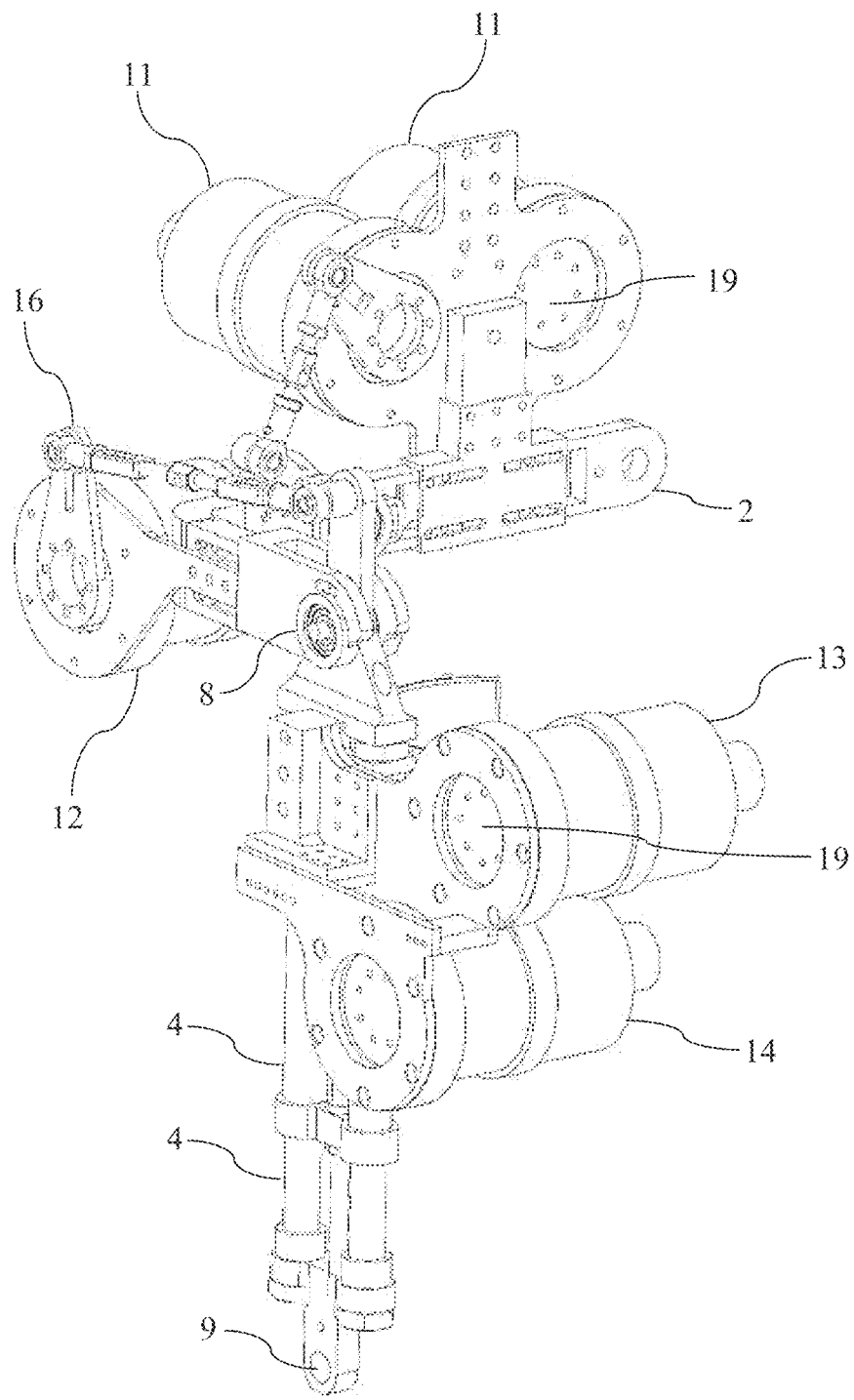
FIG. 6 is a sectional view of exoskeleton in one exemplary embodiment of the present invention.
Figure 7:
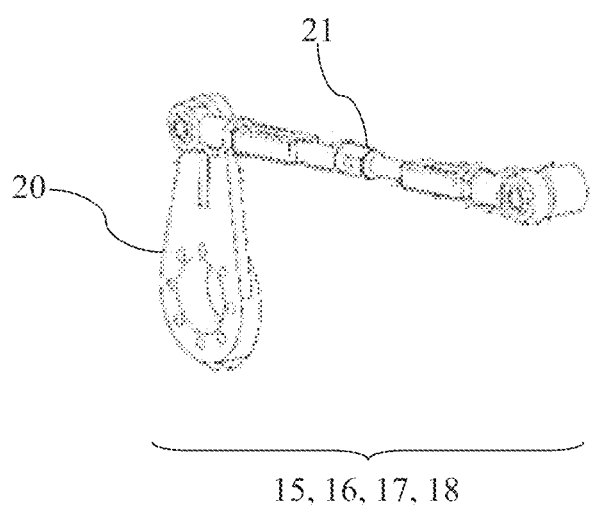
FIG. 7 is a view of drive bracket and transmitting rod of actuation transfer means in one exemplary embodiment of the present invention.
Figure 8:
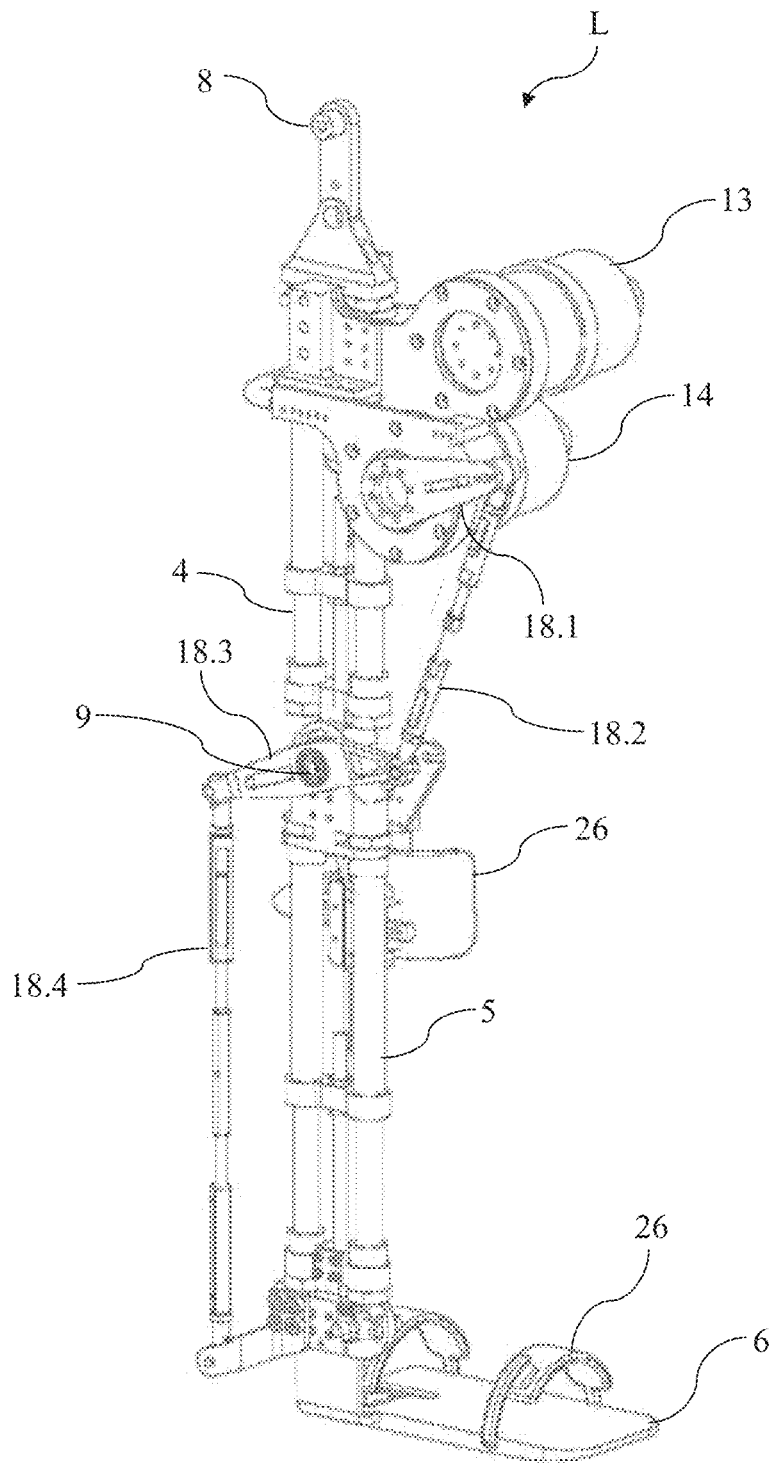
FIG. 8 is a view of right leg in one exemplary embodiment of the present invention.
Figure 9:
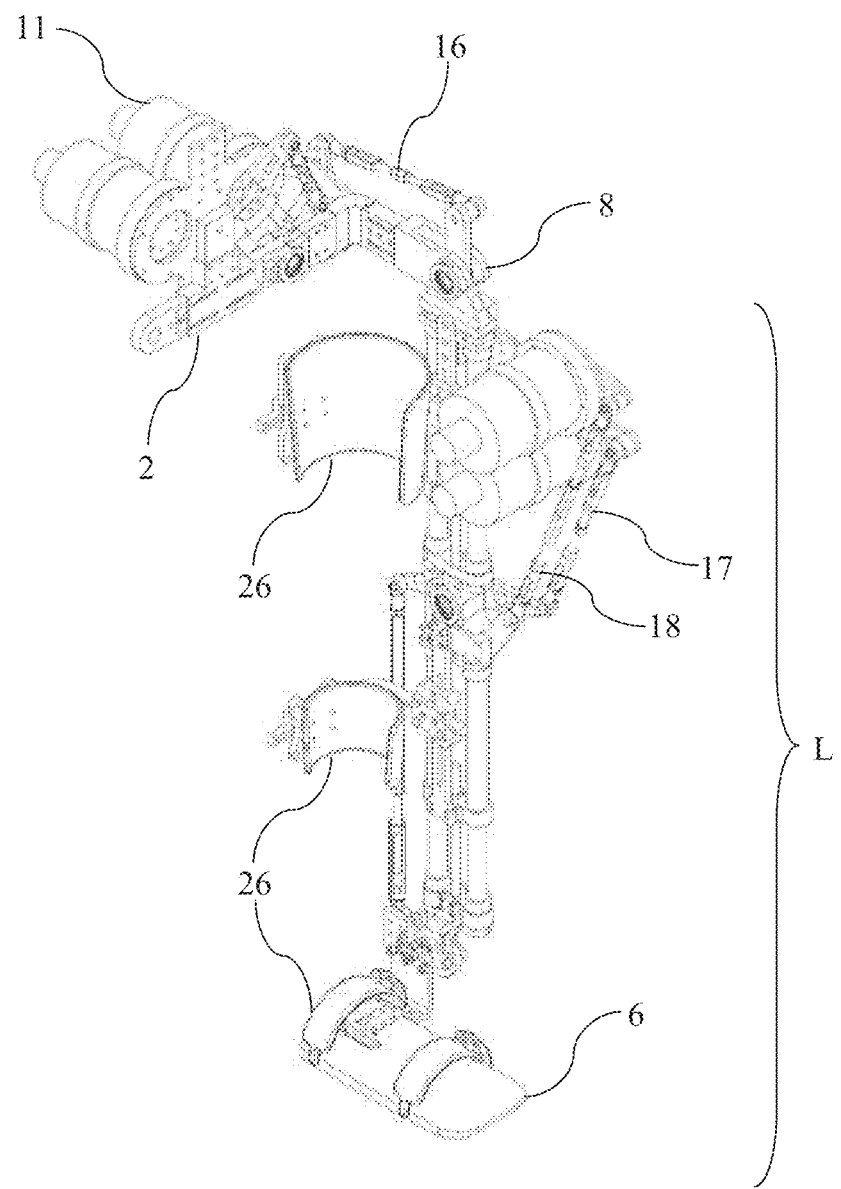
FIG. 9 is a sectional view of exoskeleton comprising left leg in one exemplary embodiment of the present invention.
Figure 10:
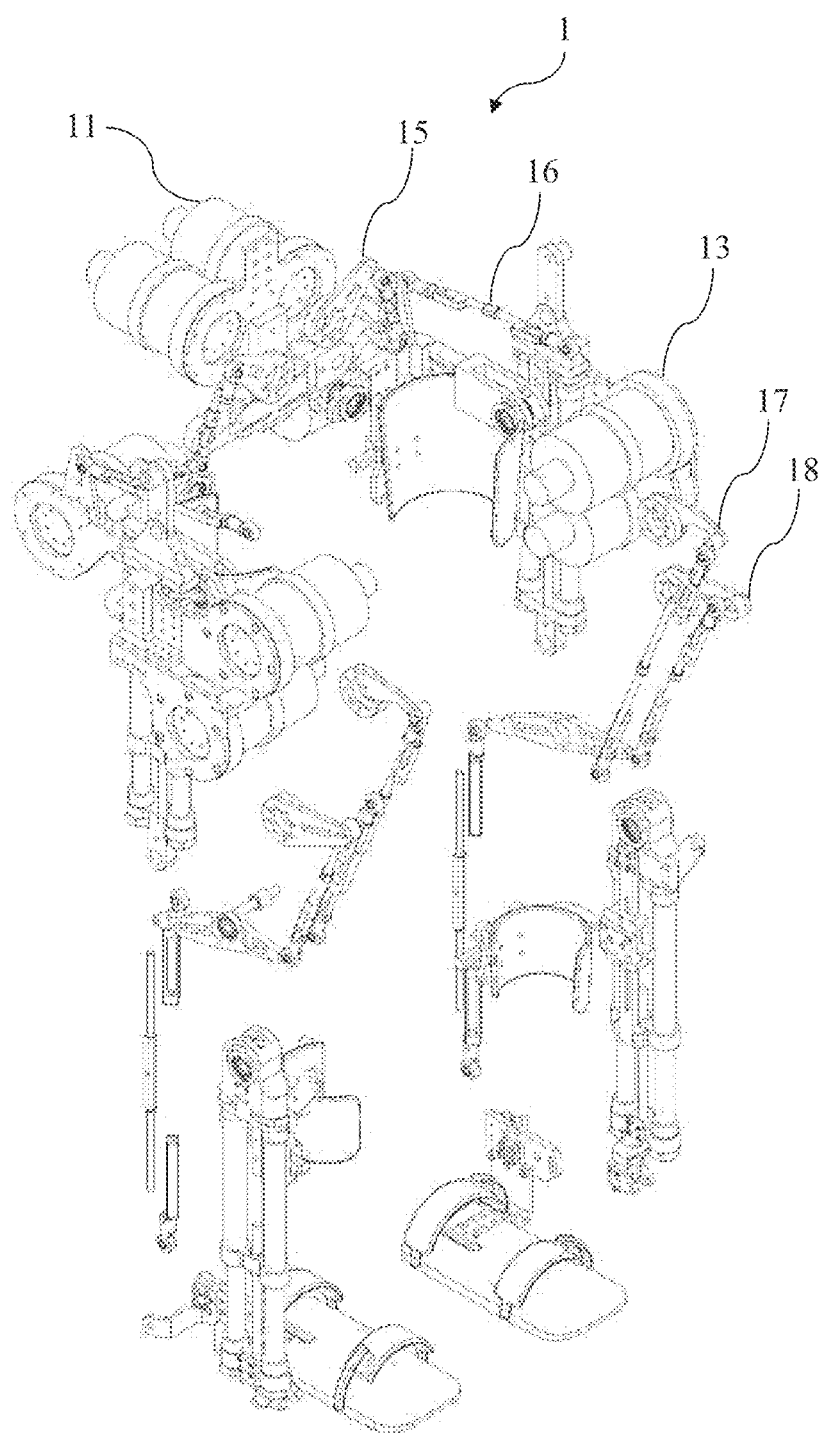
FIG. 10 is an exploded view of exoskeleton in one exemplary embodiment of the present invention.
Figure 11:
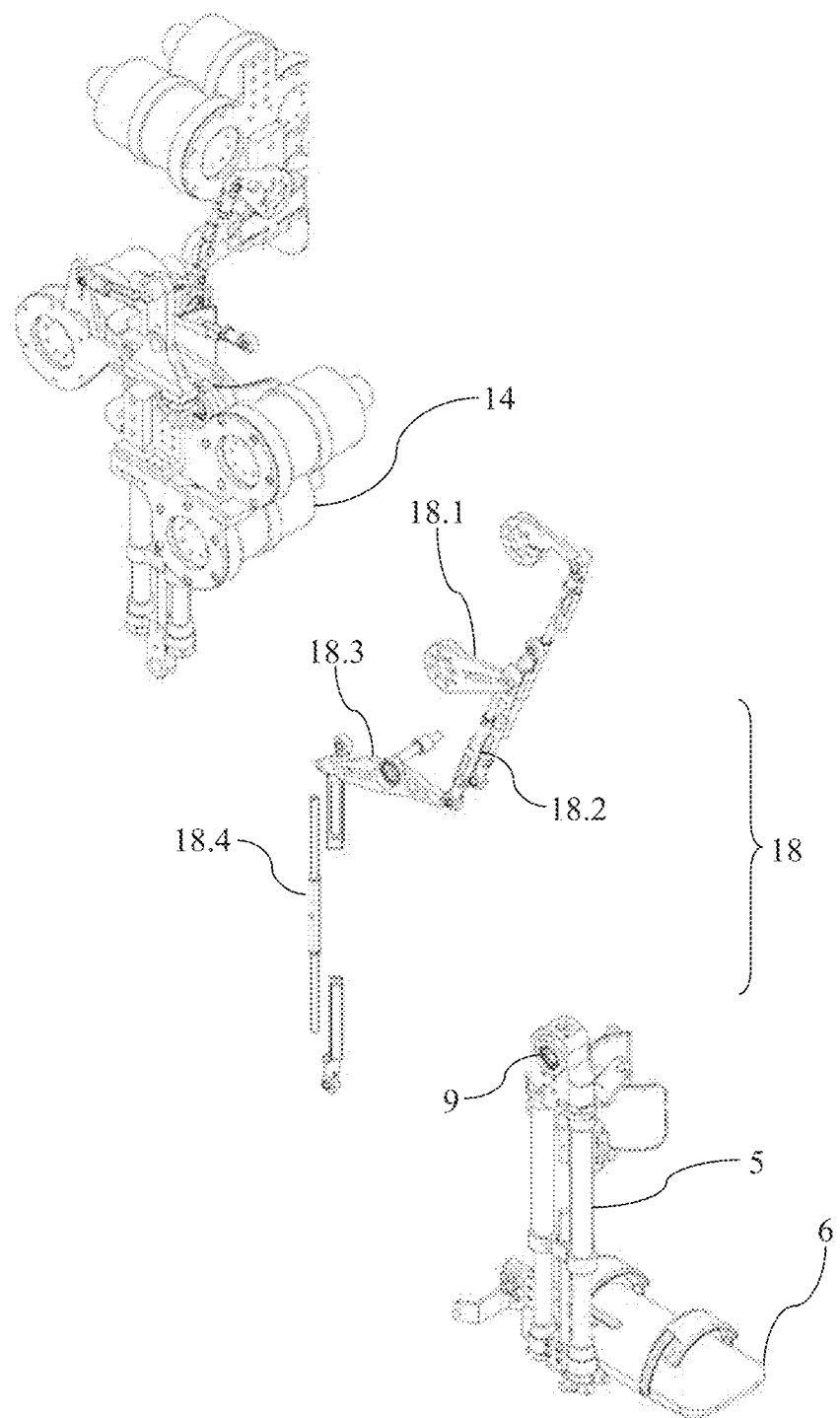
FIG. 11 is an exploded sectional view of exoskeleton comprising right leg in one exemplary embodiment of the present invention.
Figure 12:
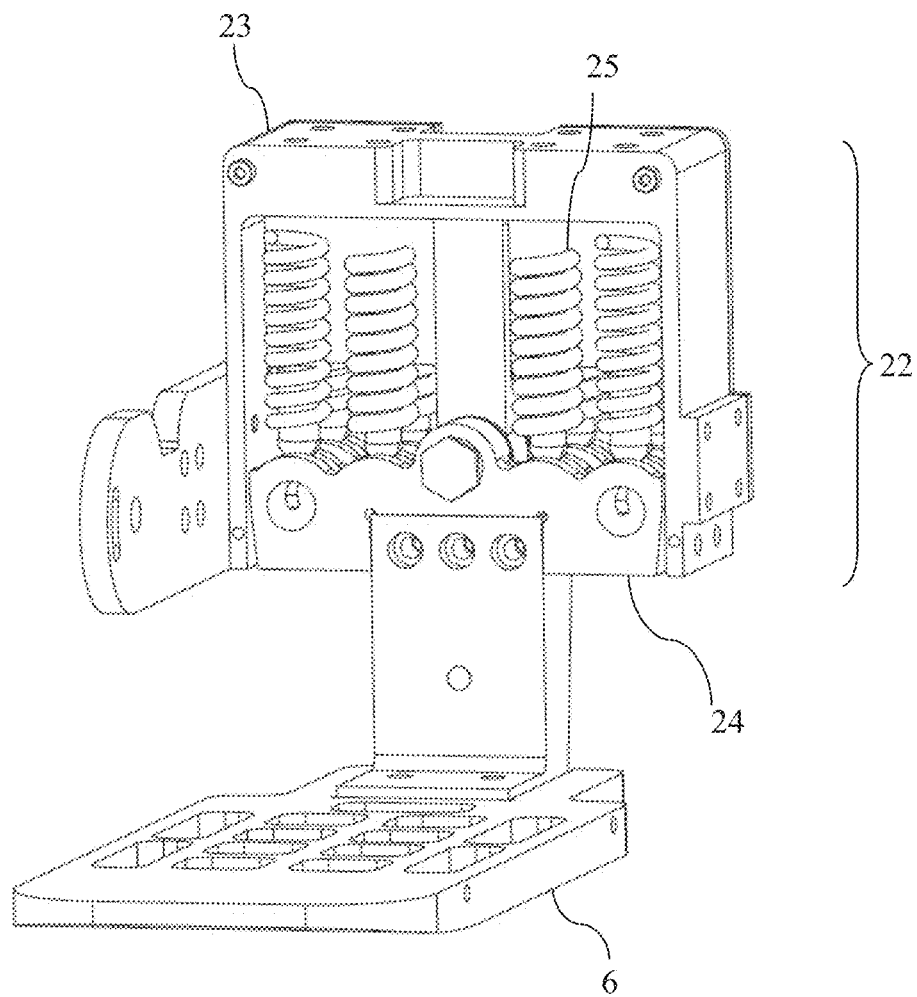
FIG. 12 is a view of resilient ankle means connected to a foot plate in one exemplary embodiment of the present invention.

Secondly, in addition to hip and knee flexion/extension capability, ankle flexion/extension capability is also provided to exoskeleton (1) by adding a foot articulation (10) for each leg (L), see FIG. 2 and especially FIG. 4. Hip articulation (7) and foot articulation (10) synergically interact with each other providing sway motion within a small range. FIG. 3 shows the range of the sway motion of the user body COM with and without foot articulation (10). It is clear that foot articulations (10) provide significant contribution for limiting the sway motion range. Unlimited sway motion results in slow locomotion and balancing problems.

Other significant improvements provided in the present invention is disposing the first actuator (11), the second actuator (12), the third actuator (13) and the fourth actuator (14) around the hip level (a position at least above the shank articulation (9)) and back and/or front of the user in at least the standing position so as to accumulate mass and inertia of the exoskeleton (1) and to reduce the lateral weight of the exoskeleton (1). Although accumulation of the actuators comes with a burden of extra weight from the actuation transfer means, the accumulated mass and inertia significantly simplifies the dynamic system's behavior of the exoskeleton (1) compared to exoskeletons with distributed mass. In conclusion, accumulation of mass and inertia, and reducing lateral weight increase the self-balancing capability, locomotion speed and accuracy of the exo skeleton (1).

In one embodiment of the present invention, at least one of the actuator is disposed around the hip level where above the shank articulation (9) due to space constraint.

In one embodiment of the present invention, the foot plate (6) is rotatably connected to the shank link (5) via at least one foot articulation (10) though a resilient ankle means (22) which provide a back-and-forth motion to the foot plate (6) in longitudinal axis. The resilient ankle means (22) keep the foot plate (6) in contact with the foot of the user in a selected tension which contributes the self-balancing. In one alternative of this embodiment, the resilient ankle means (22) comprises a box (23), a base bracket (24) disposed below the box (23), slidable inside the box (23) and resilient member (25) preferably a helical/coil spring.

In one embodiment of the present invention, the actuators are rotary motors. In this embodiment, at least one actuation transfer means (11, 12, 13, 14) comprises a drive bracket (20) fixed to a driving shaft (19) of the actuator, a transmitting rod (21) one end of which rotatably connected to the drive bracket (20) and other end of which rotatably connected to the back hip support (2) or corresponding link (3, 4, 5), or the foot plate (6) for transmitting rotational actuation of the actuators (11, 12, 13, 14).

Due to relatively high distance between the fourth actuator (14) and the foot plate (6), the fourth actuation transfer means (18) may be different than the other actuation transfer means. In one embodiment of the present invention, the fourth actuators (14) are a rotary motor and the fourth actuation transfer means (18) comprise a crank (18.1) fixed to a driving shaft (19) of the actuator. The fourth actuation transfer means (18) also comprise a coupler (18.2) one end of which rotatably connected to the crank (18.1) and other end of which rotatably connected to one end of a lever (18.3). The lever (18.3) is rotatably connected to thigh link (4) or shank articulation (9) from a middle point of itself so as to act as a fulcrum. The fourth actuation transfer means (18) also comprises a rocker (18.4) one end of which rotatably connected to other one end of the lever (18.3) and other end of the rocker (18.4) connected to the foot plate (6).

In one embodiment of the present invention, wearable lower extremity exoskeleton (1) comprises a receiver (28) adapted to receive actuation commands for actuators. Thus, actuators of the exoskeleton (1) can be controlled/commanded remotely for desired locomotion.

In one embodiment of the present invention, wearable lower extremity exoskeleton (1) comprises a control unit (27) adapted to control/command actuation of the actuators for desired locomotion. Desired locomotion may be fast/slow gait, sitting down, stairs ascent/descent or step in variable length.

In one embodiment of the present invention, wearable lower extremity exoskeleton (1) comprises a control unit (27) adapted to control/command actuation of the actuators for balancing the exoskeleton (1) according to at least one orientation sensor and/or proximity sensor (29) and/or displacement sensor and/or position sensor. Thanks to the accumulated mass and inertia significantly which simplifies the dynamic behavior of the exoskeleton (1), balancing the exoskeleton (1) is much easier. Thus, required number of sensors is significantly reduced.

In one embodiment of the present invention, back hip support (2) and/or side hip links (3) and/or thigh link (4) and/or shank link (5) and/or first actuation transfer means (15) and/or second actuation transfer means (16) and/or third actuation transfer means (17) and/or fourth actuation transfer means (18) are length adjustable so that exoskeleton (1) is configurable to any user by aligning the articulations to joints of the user and/or by adjusting back hip support (2) width and side hip links (3) depth.

In one embodiment of the present invention, wearable lower extremity exoskeleton (1) comprises at least one user connector (26) such as a hook-and-loop fastener for attaching the user to the exoskeleton (1). The user connector (26) may be provided for attached to user thigh and/or shank and/or foot. The user connector (26) position may be adjustable in three axis.

In one embodiment of the present invention, supports and/or links and/or foot plate (6) and/or articulations and/or actuation transfer means are made of carbon fiber composite which significantly reduce the overall weight of the exoskeleton (1).

What is claimed is:

1. A wearable lower extremity exoskeleton having a self-balancing capability, comprising:
   a back-hip support aligned with a hip level of a user in at least a standing position where the user wears the wearable lower extremity exoskeleton and remained standing;
   two legs, wherein each of the two legs is rotatably connected to a side hip link of at least two side hip links via at least one thigh articulation;
   wherein each of the two legs comprises a thigh link of thigh links, wherein a first end of the thigh link is rotatably connected to the side hip link, a second end of the thigh link is rotatably connected to a shank link of shank links via at least one shank articulation and a foot plate of foot plates rotatably connected to the shank link via at least one foot articulation;
   at least one first actuator providing a first rotational motion to the back-hip support and side hip links of the at least two side hip links in a coronal plane via a first actuation transfer means for supporting the user in a hip adduction and abduction;
   at least one second actuator providing a second rotational motion to the side hip links of the at least two side hip links and the thigh links in a sagittal plane via a second actuation transfer means for supporting the user in a hip flexion and extension;
   at least one third actuator providing a third rotational motion to the thigh links and the shank links in the sagittal plane via a third actuation transfer means for supporting the user in a knee flexion and extension;
   at least one fourth actuator providing a fourth rotational motion to the foot plates in the sagittal plane via a fourth actuation transfer means for supporting the user in an ankle flexion and extension;
   the at least two side hip links, wherein each of the at least two side hip links is rotatably connected to a side of the back-hip support via at least one hip articulation, wherein the at least two side hip links configured to support the user in the hip adduction and abduction; and
   wherein the at least one first actuator, the at least one second actuator, the at least one third actuator and the at least one fourth actuator are disposed around the hip level and a back and/or a front of the user in at least the standing position,
   wherein the wearable lower extremity exoskeleton is configured such that the shank link of a first leg of the two legs rotates outwardly about the at least one foot articulation of the first leg around an axis that is perpendicular to the coronal plane while the foot plate of the first leg is level on a ground and while a second leg of the two legs is lifted off of the ground.

2. The wearable lower extremity exoskeleton according to claim 1, wherein the foot plate is rotatably connected to the shank link via the at least one foot articulation through a resilient ankle means providing a back-and-forth motion to the foot plate in a longitudinal axis for keeping the foot plate in contact with a foot of the user in a selected tension.

3. The wearable lower extremity exoskeleton according to claim 2, wherein the resilient ankle means comprises a box, a base bracket disposed below, slidable inside the box and a resilient member, wherein the resilient member is a helical/coil spring.

4. The wearable lower extremity exoskeleton according to claim 1, wherein the at least one first actuator, the at least one second actuator, the at least one third actuator and the at least one fourth actuator are rotary motors and at least one of the first actuation transfer means, the second actuation transfer means, the third actuation transfer means and the fourth actuation transfer means comprises
   a drive bracket fixed to a driving shaft of the at least one first actuator, the at least one second actuator, the at least one third actuator and the at least one fourth actuator,
   a transmitting rod, wherein a first end of the transmitting rod is rotatably connected to the driving shaft and a second end of the transmitting rod is rotatably connected to the back-hip support or a corresponding link, or the foot plate for transmitting a rotational actuation of the at least one first actuator, the at least one second actuator, the at least one third actuator and the at least one fourth actuator.

5. The wearable lower extremity exoskeleton according to claim 1, wherein the at least one fourth actuator is a rotary motor and the fourth actuation transfer means comprise
   a crank fixed to a driving shaft of the at least one fourth actuator,
   a coupler, wherein a first end of the coupler is rotatably connected to the crank and a second end of the coupler is rotatably connected to one end of a lever, wherein the lever is rotatably connected from a middle point of the lever acting as a fulcrum to the thigh link or the at least one shank articulation,
   a rocker, wherein a first end of the rocker is rotatably connected to the second end of the lever and a second end of the rocker is connected to the foot plate.

6. The wearable lower extremity exoskeleton according to claim 1, further comprising a receiver adapted to receive actuation commands for the at least one first actuator, the at least one second actuator, the at least one third actuator and the at least one fourth actuator.

7. The wearable lower extremity exoskeleton according to claim 1, further comprising a control unit adapted to control/command an actuation of the at least one first actuator, the at least one second actuator, the at least one third actuator and the at least one fourth actuator.

8. The wearable lower extremity exoskeleton according to claim 7, wherein the control unit is adapted to control/command the actuation of the at least one first actuator, the at least one second actuator, the at least one third actuator and the at least one fourth actuator for balancing the wearable lower extremity exoskeleton according to at least one orientation sensor and/or proximity sensor.

9. The wearable lower extremity exoskeleton according to claim 1, wherein the back-hip support and/or the side hip links and/or the thigh link and/or the shank link and/or the first actuation transfer means and/or the second actuation transfer means and/or the third actuation transfer means and/or the fourth actuation transfer means are length adjustable, wherein the wearable lower extremity exoskeleton is configurable to any user by aligning the at least one hip articulation, the at least one thigh articulation, the at least one shank articulation and the at least one foot articulation to joints of the user and/or by adjusting a width of the back-hip support and a depth of the side hip links.

10. The wearable lower extremity exoskeleton according to claim 1, further comprising at least one user connector for attaching the user to the wearable lower extremity exoskeleton.

11. The wearable lower extremity exoskeleton according to claim 1, wherein the back-hip support and/or the side hip link, the shank link and the thigh link and/or the foot plate and/or the at least one hip articulation, the at least one thigh articulation, the at least one shank articulation and the at least one foot articulation and/or the first actuation transfer means, the second actuation transfer means, the third actuation transfer means and the fourth actuation transfer means are made of carbon fiber.

12. The wearable lower extremity exoskeleton according to claim 2, wherein the at least one first actuator, the at least one second actuator, the at least one third actuator and the at least one fourth actuator are rotary motors and at least one of the first actuation transfer means, the second actuation transfer means, the third actuation transfer means and the fourth actuation transfer means comprises a drive bracket fixed to a driving shaft of the at least one first actuator, the at least one second actuator, the at least one third actuator and the at least one fourth actuator, a transmitting rod, wherein a first end of the transmitting rod is rotatably connected to the driving shaft and a second end of the transmitting rod is rotatably connected to the back-hip support or a corresponding link, or the foot plate for transmitting a rotational actuation of the at least one first actuator, the at least one second actuator, the at least one third actuator and the at least one fourth actuator.

13. The wearable lower extremity exoskeleton according to claim 3, wherein the at least one first actuator, the at least one second actuator, the at least one third actuator and the at least one fourth actuator are rotary motors and at least one of the first actuation transfer means, the second actuation transfer means, the third actuation transfer means and the fourth actuation transfer means comprises a drive bracket fixed to a driving shaft of the at least one first actuator, the at least one second actuator, the at least one third actuator and the at least one fourth actuator, a transmitting rod, wherein a first end of the transmitting rod is rotatably connected to the driving shaft and a second end of the transmitting rod is rotatably connected to the back-hip support or a corresponding link, or the foot plate for transmitting a rotational actuation of the at least one first actuator, the at least one second actuator, the at least one third actuator and the at least one fourth actuator.

14. The wearable lower extremity exoskeleton according to claim 2, wherein the at least one fourth actuator is a rotary motor and the fourth actuation transfer means comprise a crank fixed to a driving shaft of the at least one fourth actuator, a coupler, wherein a first end of the coupler is rotatably connected to the crank and a second end of the coupler is rotatably connected to one end of a lever, wherein the lever is rotatably connected from a middle point of the lever acting as a fulcrum to the thigh link or the at least one shank articulation, a rocker, wherein a first end of the rocker is rotatably connected to the second end of the lever and a second end of the rocker is connected to the foot plate.

15. The wearable lower extremity exoskeleton according to claim 3, wherein the at least one fourth actuator is a rotary motor and the fourth actuation transfer means comprise a crank fixed to a driving shaft of the at least one fourth actuator, a coupler, wherein a first end of the coupler is rotatably connected to the crank and a second end of the coupler is rotatably connected to one end of a lever, wherein the lever is rotatably connected from a middle point of the lever acting as a fulcrum to the thigh link or the at least one shank articulation, a rocker, wherein a first end of the rocker is rotatably connected to the second end of the lever and a second end of the rocker is connected to the foot plate.

16. The wearable lower extremity exoskeleton according to claim 4, wherein the at least one fourth actuator is a rotary motor and the fourth actuation transfer means comprise a crank fixed to a driving shaft of the at least one fourth actuator, a coupler, wherein a first end of the coupler is rotatably connected to the crank and a second end of the coupler is rotatably connected to one end of a lever, wherein the lever is rotatably connected from a middle point of the lever acting as a fulcrum to the thigh link or the at least one shank articulation, a rocker, wherein a first end of the rocker is rotatably connected to the second end of the lever and a second end of the rocker is connected to the foot plate.

17. The wearable lower extremity exoskeleton according to claim 2, further comprising a receiver adapted to receive actuation commands for the at least one first actuator, the at least one second actuator, the at least one third actuator and the at least one fourth actuator.

18. The wearable lower extremity exoskeleton according to claim 3, further comprising a receiver adapted to receive actuation commands for the at least one first actuator, the at least one second actuator, the at least one third actuator and the at least one fourth actuator.

19. The wearable lower extremity exoskeleton according to claim 4, further comprising a receiver adapted to receive actuation commands for the at least one first actuator, the at least one second actuator, the at least one third actuator and the at least one fourth actuator.

20. The wearable lower extremity exoskeleton according to claim 5, further comprising a receiver adapted to receive actuation commands for the at least one first actuator, the at least one second actuator, the at least one third actuator and the at least one fourth actuator.

* * * * *